United States Patent

Bayly

[11] Patent Number: 5,932,650
[45] Date of Patent: Aug. 3, 1999

[54] ONE COMPONENT ROOM TEMPERATURE VULCANIZABLE (RTV) SILICONE SEALANT WITH IMPROVED HIGH TEMPERATURE ADHESION

[75] Inventor: Brian P. Bayly, Middle Grove, N.Y.

[73] Assignee: General Electric Company, Pittsfield, Mass.

[21] Appl. No.: 08/591,880

[22] Filed: Jan. 26, 1996

[51] Int. Cl.$^6$ ................... C08J 5/54; C08K 5/24
[52] U.S. Cl. .............. 524/731; 524/268; 528/16; 528/17
[58] Field of Search .................. 524/268, 731; 518/16, 17

[56] References Cited

U.S. PATENT DOCUMENTS

| | | | |
|---|---|---|---|
| 2,759,904 | 8/1956 | Talcott | 260/37 |
| 2,938,009 | 5/1960 | Lucas | 260/37 |
| 3,004,859 | 10/1961 | Lichtenwalner | 106/308 |
| 3,235,495 | 2/1966 | Buebler | 252/34.7 |
| 3,309,312 | 3/1967 | Buebler | 252/18 |
| 3,635,743 | 1/1972 | Smith | 106/288 Q |
| 4,100,129 | 7/1978 | Beers | 260/375 B |
| 4,486,566 | 12/1984 | Nakasuji et al. | 524/788 |
| 4,523,353 | 6/1985 | Hubbard et al. | 24/30.5 R |
| 4,962,152 | 10/1990 | Leempol | 524/788 |
| 5,354,833 | 10/1994 | Dziark | 528/36 |

*Primary Examiner*—Robert Dawson
*Assistant Examiner*—D. Aylward
*Attorney, Agent, or Firm*—Kenneth S. Wheelock; Michelle Bugbee

[57] ABSTRACT

Room temperature vulcanizable silicone compositions comprising an iron carboxylate exhibit improved high temperature adhesion.

20 Claims, No Drawings

ONE COMPONENT ROOM TEMPERATURE VULCANIZABLE (RTV) SILICONE SEALANT WITH IMPROVED HIGH TEMPERATURE ADHESION

FIELD OF THE INVENTION

The present invention relates to a one component room temperature vulcanizable silicone sealant having improved high temperature adhesion.

BACKGROUND OF THE INVENTION

Room temperature vulcanizable silicone elastomers are known in the art. Generally these polymer or elastomer compositions contain a silanol stopped silicone base polymer, reinforcing and/or extending fillers, cross-linking silanes, and cure catalysts. Such composition are disclosed in U.S. Pat. Nos. 4,100,129 to Beers, 4,523,353 to Lucas, and 5,354,833 to Dziark.

Iron carboxylate salts are known in the art for their ability to improve the high temperature stability of silicone fluids, U.S. Pat. Nos. 3,309,312 and 3,235,495 to Buehler. It is also known that iron carboxylate salts can be used to improve the heat stability of heat curable organosilicon compositions, U.S. Pat. No. 2,759,904.

SUMMARY OF THE INVENTION

The present invention relates to a one component room temperature vulcanizable silicone composition that comprises a silanol stopped polydimethylsiloxane polymer, a silica filler, a stearic acid treated calcium carbonate filler, an acetoxysilane cross-linker, a tin based cure catalyst, optional plasticizers, pigments, and adhesion promoters and an iron carboxylate salt whereby the silicone composition exhibits improved adhesion properties after being exposed to high temperatures.

The present invention provides for a one component room temperature vulcanizable silicone composition having improved adhesion comprising:

(A) a polyorganosiloxane of the formula HO—$(R^1R^2SiO)_n$—H where $R^1$ and $R^2$ are each independently selected from the group consisting of one to eight carbon atom monovalent hydrocarbon radicals;

(B) a non-reinforcing or extending filler;

(C) a reinforcing fumed silica filler;

(D) a cross-linking acetoxysilane;

(E) an organometallic tin condensation cure catalyst; and (F) an iron carboxylate salt.

DETAILED DESCRIPTION OF THE INVENTION

The present invention provides for a one component room temperature vulcanizable silicone composition having improved adhesion after heat aging comprising:

(A) from about 50 to about 100 parts by weight of a silanol stopped polyorganosiloxane having a viscosity ranging from 600 to about 300,000 centipoise (cps), more preferably a viscosity ranging from about 1,000 to 200,000 cps, and most preferably from about 3,000 to about 150,000 cps at 25° C. having the formula HO—$(R^1R^2SiO)_n$—H where $R^1$ and $R^2$ are each independently selected from the group consisting of one to eight carbon atom monovalent hydrocarbon radicals;

(B) from about 5 to about 60 parts by weight of a non-reinforcing or extending filler;

(C) from about 3 to about 25 parts by weight of a reinforcing fumed silica filler;

(D) from about 2 to about 15 parts by weight of a cross-linking acetoxysilane;

(E) from about 0.01 to about 0.4 parts by weight of an organometallic tin condensation cure catalyst;

(F) from about 0.1 to about 5 parts by weight of an iron carboxylate salt; and (G) optional conventional additives such as plasticizers, adhesion promoters, pigments and the like.

The polyorganosiloxane polymer, component (A), of the composition of the present invention is a polymer where the organic substituents of the polymer backbone, $R^1$ and $R^2$, are independently selected from the group of one to eight carbon atom monovalent hydrocarbon radicals including halogenated monovalent radicals such as fluoroalkyl, cycloaliphatic radicals such as cyclohexyl and cyclopentyl, and aromatic radicals such as phenyl and naphthyl. Preferably both $R^1$ and $R^2$ are methyl groups.

The non-reinforcing or extending filler, component (B) is preferably a stearic acid treated calcium carbonate filler. While from 5 to about 60 parts by weight of the non-reinforcing filler may be used it is preferred to use from about 10 to about 30 parts by weight.

The reinforcing filler, component (C), is a fumed or pyrogenic silica having a surface area in excess of 100 $m^2/gm$. The fumed or pyrogenic silica filler may be treated with cyclic organosiloxanes such as octamethyltetracyclosiloxane, decamethylpentacyclosiloxane and the like or silazanes such as hexamethyldisilazane. Such treated silica fillers are disclosed and taught in U.S. Pat. Nos. 2,938,009 to Lucas, 3,004,859 to Lichtenwalner, and 3,635743 to Smith. While from about 3 to about 25 parts by weight of the reinforcing silica filler may be used it is preferable to use from about 3 to about 20 parts by weight and most preferred to use from about 5 to 15 parts by weight.

The cross-linking acetoxysilane, component (D) may be present in an amounts ranging from 2 to about 15 parts by weight, more preferably from about 2 to about 10 parts by weight and most preferably from about 4 to about 8 parts by weight. The preferred acetoxysilane cross-linkers are methyltriacetoxysilane, ethyltriacetoxysilane or mixtures thereof.

The organometallic tin condensation cure catalyst, component (E), is a tin carboxylate condensation cure catalyst present in an amount ranging from about 0.01 to about 0.4 parts by weight, preferably from about 0.05 to about 0.3 parts by weight and most preferably from about 0.10 to about 0.25 parts by weight. The preferred tin compounds are dibutyl tin dilaurate, dibutyl tin diacetate, dibutyl tin laurate acetate, or mixtures thereof.

The iron carboxylate salt, component (F), is present in an amount ranging from about 0.1 to about 5 parts by weight, preferably from about 0.3 to about 2 parts by weight and most preferably from about 0.4 to about 1 part by weight. The iron carboxylate salt may be any iron salt of a mono, di or poly-carboxylic acid such as iron acetate, iron propionate, iron butyrate, iron benzoate, iron toluate, iron cylohexanoate, iron maleate, iron fumarate, iron octoate and iron phthalate, but it is preferred that the carboxylic acid be a longer chain carboxylic acid such as octoic acid, thus iron octoate is a preferred iron carboxylate salt.

A particularly convenient method of preparing the compositions of the present invention is to regard the parts by weight ranges previously recited for each of the components as parts by weight per hundred parts by weight of the total composition.

The composition of the present invention may be further modified by the incorporation of additional components such as plasticizers, adhesion promoters, pigments and the like.

When a linear plasticizer is used, a trimethylsilyl stopped polydimethylsiloxane having a viscosity ranging from 10 to 50,000 centipoise at 25° C. is preferred, more preferably 10 to 35,000 cps, and most preferably 10 to 20,000 cps.

When adhesion promoters are added to the composition, suitable adhesion promoters include glycidoxypropyltrimethoxysilane, aminoethylaminopropyltrimethoxysilane, methacryloxypropyltrimethoxysilane, vinyltrimethoxysilane, and di-t-butoxydiacetoxysilane. A preferred adhesion promoter is di-t-butoxydiacetoxysilane.

When it is desired to add pigments to the composition suitable pigments include carbon black, titanium dioxide, red iron oxide, flaked aluminum and the like.

All United States patents referenced herein are herewith and hereby specifically incorporated by reference.

Experimental

Adhesion Test

The adhesion test measuring the advantages of the composition of the present invention was performed in a lap shear configuration using glass to porcelain painted metal. The substrates were one inch wide and overlapped by ½ inch with a 1/16 inch thickness of the silicone composition. The test samples were allowed to cure for 7 days. Additional samples were made and allowed to cure for 7 days and then were placed in an oven at 360° F. for an additional 14 days. The samples were then pulled to destruction, measuring cohesive failure of the silicone composition. Cohesive failure indicates that the elastomer failed internally in contrast to failure of the elastomer to substrate bond which is an adhesive failure. Thus 100% cohesive failure indicates that there was no adhesive failure of the elastomer to substrate bond.

Example 1

Example 1 describes the preparation of a reference one component room temperature vulcanizable silicone composition that does not have any iron carboxylate present. The components used were:

(A) 55.5 parts by weight of a silanol stopped polydimethylsiloxane having a viscosity of 50,000 cps at 25° C.;

(B) 15 parts by weight of a stearic acid treated calcium carbonate extending filler;

(C) 15 parts by weight of a fumed silica reinforcing filler that had been treated with a cyclic polydimethylsiloxane;

(D) 5.2 parts by weight of ethyltriacetoxysilane cross-linking component;

(E) 0.033 parts by weight of dibutyl tin dilaurate tin condensation cure catalyst;

(F) 0.0 parts by weight of an iron carboxylate salt; and (G)
  a) 7 parts by weight of a linear trimethylsilyl stopped polydimethylsiloxane linear plasticizing fluid;
  b) 1.27 parts by weight of di-t-butoxydiacetoxysilane adhesion promoter; and
  c) 1 part by weight carbon black pigment.

TABLE 1

Lap Shear and Heat Aged Lap Shear Tests of Reference Silicone Composition

|  | 7 Day Cure | 7 Day Cure + 14 Days at 360° F. |
|---|---|---|
| Ultimate Tensile | 340 | 127 |
| % Cohesive Failure to Glass | 100 | 0 |
| % Cohesive Failure to Porcelain | 100 | 100 |

Example 2

Example 2 describes the preparation of an example of the composition of the present invention as a one component room temperature vulcanizable silicone composition that does have iron carboxylate present. The components used were:

(A) 55.0 parts by weight of a silanol stopped polydimethylsiloxane having a viscosity of 50,000 cps at 25° C.;

(B) 15 parts by weight of a stearic acid treated calcium carbonate extending filler;

(C) 15 parts by weight of a fumed silica reinforcing filler that had been treated with a cyclic polydimethylsiloxane;

(D) 5.2 parts by weight of ethyltriacetoxysilane cross-linking component;

(E) 0.033 parts by weight of dibutyl tin dilaurate tin condensation cure catalyst;

(F) 0.5 parts by weight of an iron carboxylate salt; and (G)
  a) 7 parts by weight of a linear trimethylsilyl stopped polydimethylsiloxane linear plasticizing fluid;
  b) 1.27 parts by weight of di-t-butoxydiacetoxysilane adhesion promoter; and
  c) 1 part by weight carbon black pigment.

TABLE 2

Lap Shear and Heat Aged Lap Shear Tests of Iron Carboxylate Containing Silicone Composition

|  | 7 Day Cure | 7 Day Cure + 14 Days at 360° F. |
|---|---|---|
| Ultimate Tensile | 260 | 272 |
| % Cohesive Failure to Glass | 100 | 90 |
| % Cohesive Failure to Porcelain | 100 | 90 |

Example 3

Example 3 is a repeat of example 1 using a continuous extruder for the preparation of the silicone composition instead of a batch method of preparation.

TABLE 3

Lap Shear and Heated Lap Shear Tests of Reference Silicone Composition Prepared in a Continuous Extruder

|  | 7 Day Cure | 7 Day Cure + 14 Days at 360° F. |
|---|---|---|
| Ultimate Tensile | 216 | 147 |
| % Cohesive Failure to Glass | 100 | 40 |
| % Cohesive Failure to Porcelain | 100 | 50 |

Example 4

Example 4 is a repeat of example 2 using a continuous extruder for the preparation of the silicone composition instead of a batch method of preparation.

TABLE 4

Lap Shear and Heat Aged Lap Shear Tests of Iron Carboxylate Containing Silicone Composition Prepared in a Continuous Extruder

|  | 7 Day Cure | 7 Day Cure + 14 Days at 360° F. |
|---|---|---|
| Ultimate Tensile | 300 | 260 |
| % Cohesive Failure to Glass | 100 | 90 |
| % Cohesive Failure to Porcelain | 100 | 100 |

The addition of iron carboxylate salts to room temperature vulcanizable silicone compositions improves the adhesion of the silicone composition to glass or porcelain in an amount by cohesive failure exceeding 50 percent in both cases.

Having described the invention, that which is claimed is:

1. A one component room temperature vulcanizable silicone composition comprising:
    (A) a polyorganosiloxane of the formula HO—$(R^1R^2SiO)_n$—H
      where $R^1$ and $R^2$ are each independently selected from the group consisting of one to eight carbon atom monovalent hydrocarbon radicals where n is chosen such that the viscosity ranges from 600 to about 300,000 centipoise at 25° C.;
    (B) a non-reinforcing or extending filler;
    (C) a reinforcing fumed silica filler;
    (D) a cross-linking acetoxysilane;
    (E) an organometallic tin condensation cure catalyst; and
    (F) an iron carboxylate salt;
  whereby cohesive failure is greater than 50% after 14 days of heat aging at 360° F.

2. The composition of claim 1 wherein $R^1$ and $R^2$ of component (A) are methyl.

3. The composition of claim 2 wherein the non-reinforcing filler, component (B), is calcium carbonate.

4. The composition of claim 3 wherein the calcium carbonate has been treated with stearic acid.

5. The composition of claim 4 wherein the fumed silica filler, component (C), has been treated with a cyclic organopolysiloxane.

6. The composition of claim 5 wherein the tin condensation cure catalyst, component (E), is selected from the group consisting of dibutyl tin diacetate, dibutyl tin dilaurate, dibutyl tin laurate acetate and mixtures thereof.

7. The composition of claim 6 wherein the iron carboxylate salt, component (f), is iron octoate.

8. The composition of claim 7 further comprising a plasticizer, component (G).

9. The composition of claim 8 wherein said plasticizer is a linear trimethylsilyl stopped polydimethylsiloxane plasticizing fluid having a viscosity ranging from 10 to 50,000 centipoise at 25° C.

10. The composition of claim 9 further comprising an adhesion promoter.

11. The composition of claim 10 wherein said adhesion promoter is di-t-butoxydiacetoxysilane.

12. The composition of claim 11 further comprising a pigment.

13. The composition of claim 12 wherein said pigment is carbon black.

14. The composition of claim 1 wherein the amount of iron carboxylate salt, component (F), present in the composition ranges from about 0.1 to about 5 parts by weight per hundred parts by weight of the total composition.

15. The composition of claim 14 wherein the amount of said iron carboxylate salt, component (F), ranges from about 0.3 to about 2 parts by weight per hundred parts by weight of the total composition.

16. The composition of claim 15 wherein the amount of said iron carboxylate salt, component (F), ranges from about 0.4 to about 1 part by weight per hundred parts by weight of the total composition.

17. The composition of claim 16 wherein the iron carboxylate salt, component (F), is iron octoate.

18. The composition of claim 17 wherein the cross-linking acetoxysilane, component (D), is selected from the group consisting of methyltriacetoxysilane, ethyltriacetoxysilane, and mixtures thereof.

19. A one component room temperature vulcanizable silicone composition consisting essentially of:
    (A) a polyorganosiloxane of the formula HO—$(R^1R^2SiO)_n$—H
      where $R^1$ and $R^2$ are each independently selected from the group consisting of one to eight carbon atom monovalent hydrocarbon radicals where n is chosen such that the viscosity ranges from 600 to about 300,000 centipoise at 25° C.;
    (B) a non-reinforcing or extending filler;
    (C) a reinforcing fumed silica filler;
    (D) a cross-linking acetoxysilane;
    (E) an organometallic tin condensation cure catalyst; and
    (F) an iron carboxylate salt;
  whereby cohesive failure is greater than 50% after 14 days of heat aging at 360° F.

20. A one component room temperature vulcanizable silicone composition having improved adhesion comprising:
    (A) a polyorganosiloxane of the formula HO—$(R^1R^2SiO)_n$—H
      where $R^1$ and $R^2$ are each independently selected from the group consisting of one to eight carbon atom monovalent hydrocarbon radicals where n is chosen such that the viscosity ranges from 600 to about 300,000 centipoise at 25° C.;
    (B) a non-reinforcing or extending filler;
    (C) a reinforcing fumed silica filler;
    (D) a cross-linking acetoxysilane;
    (E) an organometallic tin condensation cure catalyst; and
    (F) an iron carboxylate salt.

* * * * *